(12) United States Patent
Selders

(10) Patent No.: US 7,475,859 B2
(45) Date of Patent: Jan. 13, 2009

(54) ACCESSORY HANGER FOR MOUNTING ON A VERTICAL POLE

(76) Inventor: Sean Michael Selders, 503 Freeman St., Longwood, FL (US) 32750

( * ) Notice: Subject to any disclaimer, the term of this patent is extended or adjusted under 35 U.S.C. 154(b) by 457 days.

(21) Appl. No.: 11/265,005

(22) Filed: Nov. 2, 2005

(65) Prior Publication Data
US 2007/0095996 A1    May 3, 2007

(51) Int. Cl.
F16B 45/00 (2006.01)
(52) U.S. Cl. ............... 248/304; 248/218.4; 211/107
(58) Field of Classification Search ............. 248/217.4, 248/218.4, 219.2, 219.4, 227.3, 230.1, 230.8, 248/304; 211/107, 106.11, 118, 196
See application file for complete search history.

(56) References Cited

U.S. PATENT DOCUMENTS

| | | | | |
|---|---|---|---|---|
| 60,581 A * | 12/1866 | Robinson | ..................... | 211/107 |
| 118,241 A * | 8/1871 | Herreman | ..................... | 211/107 |
| 409,239 A * | 8/1889 | Roller | ..................... | 248/304 |
| 753,446 A * | 3/1904 | Swartwout | ..................... | 211/107 |
| 939,318 A * | 11/1909 | Redman | ..................... | 248/304 |
| 1,331,525 A * | 2/1920 | Pratt | ..................... | 211/107 |
| 1,441,913 A * | 1/1923 | Darling | ..................... | 211/107 |
| 3,332,654 A | 7/1967 | Jacobson | | |
| 3,910,541 A | 10/1975 | German | | |
| 4,629,074 A | 12/1986 | Toder | | |
| 4,908,982 A | 3/1990 | Quatrini | | |
| 4,953,819 A | 9/1990 | Davis | | |
| 5,522,514 A | 6/1996 | Robinson | | |
| 6,059,241 A | 5/2000 | Martone | | |
| 6,086,031 A | 7/2000 | Renfro | | |
| 6,182,934 B1 * | 2/2001 | Kelley | ..................... | 248/304 |
| 6,409,131 B1 | 6/2002 | Bentley et al. | | |
| 6,675,819 B2 | 1/2004 | Arrowood et al. | | |

* cited by examiner

Primary Examiner—Gwendolyn Baxter
(74) Attorney, Agent, or Firm—John V. Stewart

(57) ABSTRACT

A band (30) is buckled around a pole (50). A hanger arm (18) has a top end attached to the band (30) at an attachment point (44), and has a bottom end with a load hook (20). A high-friction cam surface (24) is formed on the hanger arm (18). The relative positions of the cam (24), the band attachment point (44), and the load hook (20) cause the band attachment point (44, 46) to move away from the pole (50) as the hanger arm is loaded, tightening the band (30) on the pole (50). This automatically adjusts the hoop tension in the encircling band (30) depending on the arm loading (52).

6 Claims, 4 Drawing Sheets

ACCESSORY HANGER FOR MOUNTING ON A VERTICAL POLE

BACKGROUND OF THE INVENTION

1. Field of the Invention

This invention relates to hangers that are releasably attachable to a vertical pole such as a beach umbrella pole, for hanging accessories, such as towels, cameras, food, water, etc.

2. Description of Prior Art

Attachable hangers have been provided for vertical poles such as on beach and patio umbrellas, and for hospital intravenous drip poles. Previous hangers of this type are normally attached to the vertical pole by one or more setscrews. These damage the pole surface, and can break a corrosion barrier such as paint or plating. Setscrews also take time to tighten, may require a tool, and can slip due to inadequate tightening or to subsequent loosening. Other hanger attachment means use hoop stress and radial stress in an encircling band with a frictional surface to hold hanger arms on a vertical pole. U.S. Pat. No. 4,953,819 (Davis) is an example of these. Attachment of Davis requires substantial leveraged effort because the band must be initially manually tensioned for the maximum possible load.

SUMMARY OF THE INVENTION

Objectives of this invention include providing inexpensive accessory hangers that instantly attach to vertical poles with minimal effort without damage to the surface of the pole, and can hold a light or heavy weight without manual adjustment. This is achieved in the present invention with a hanger arm cam mechanism that automatically tightens the encircling band when the arm is loaded.

REFERENCE CHARACTERS

Figure 1:
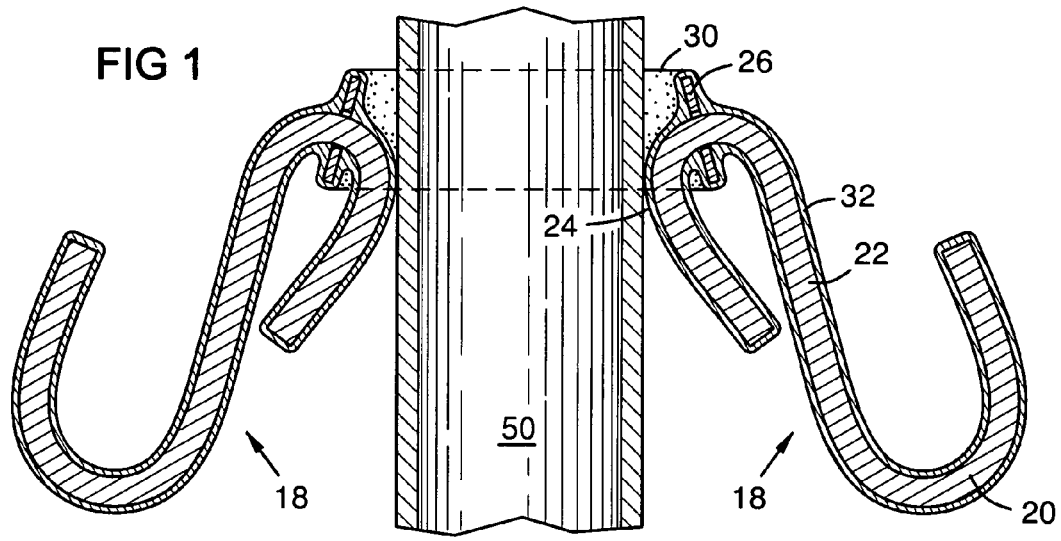
FIG. 1 is a front sectional view of a ring of hangers mounted on a pole.

18. Hanger arm in unloaded position
19. Hanger arm in loaded position
20. Load hook portion of hanger arm
22. Lever portion of hanger arm
24. Cam surface of hanger arm
26. Mounting strap
27. Mounting strap buckle hooks
28. Hole in mounting strap for hanger arm
30. Pole encircling band or ring
32. High friction elastic coating
40. Contact point of cam surface on pole
42. Vertical distance from strap center to cam contact point
44. Strap center point in hanger arm when hanger arm is not loaded
46. Strap center point in hanger arm when hanger arm is loaded
48. Change of position in strap center point due to loading
50. Pole, such as beach umbrella pole
52. Load, such as bag, towel, camera strap etc.
54. Movement of hanger arm due to loading
56. Unloaded radial distance of mounting strap from pole
58. Loaded radial distance of mounting strap from pole

DETAILED DESCRIPTION

FIG. 1 illustrates a ring 30 of hanger arms 18 mounted on a vertical pole 50 according to aspects of the invention. Each hanger arm 18 in FIG. 1 is shown in its unloaded position. Each hanger arm has a load hook portion 20, a lever portion 22, and a cam surface 24. A plurality of such hanger arms may be mounted on the pole 50 by an encircling band 30. A preferred shape for the hanger arm 18 is generally S-shaped, with an upper loop than includes the cam surface 24, and a lower loop providing the hook portion 20.

Figure 2:
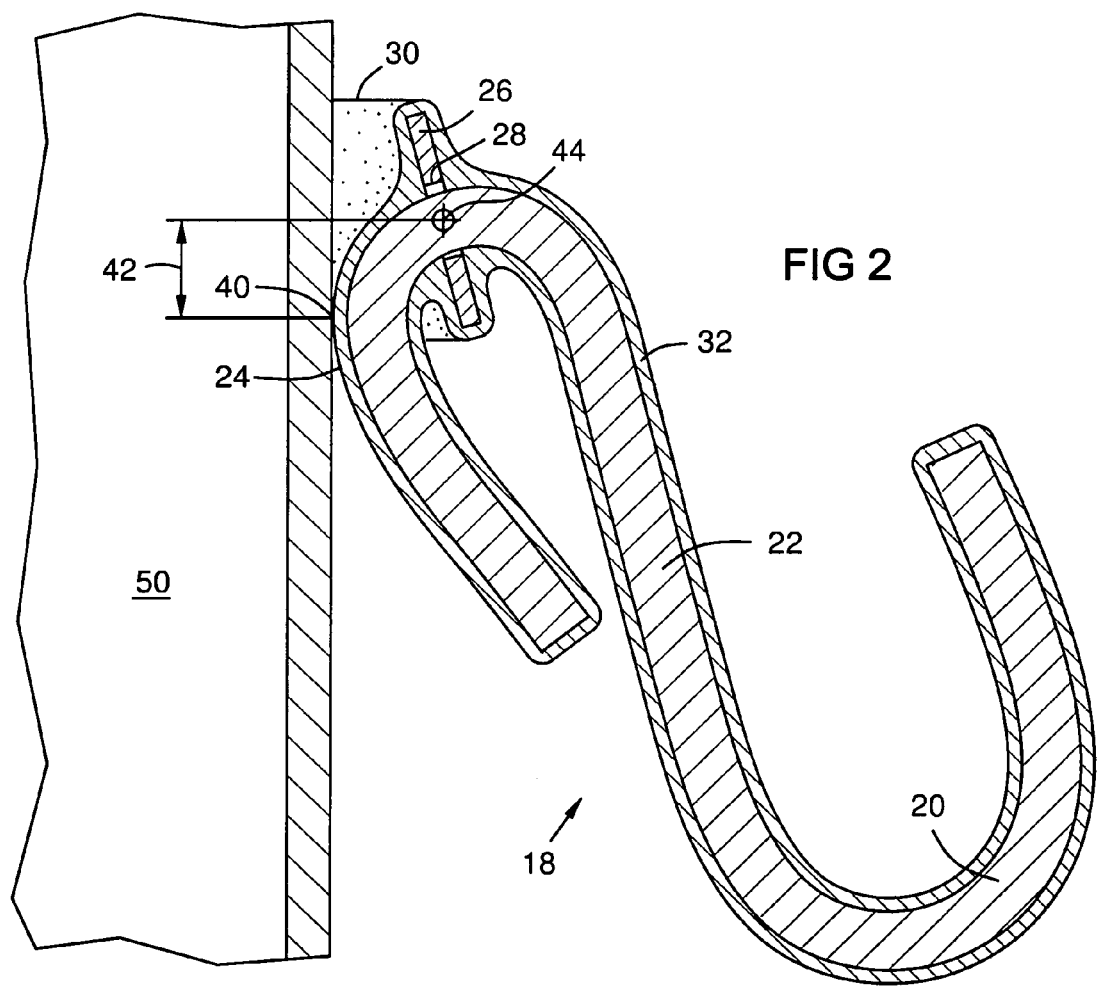
FIG. 2 is an enlarged sectional view of a hanger mounted on a pole showing a cam feature.

FIG. 2 illustrates details of FIG. 1. The upper end of each arm 18 is attached to a strap 26 at a given point 44. For example, the strap 26 may have a hole 28 to receive the upper end of each respective hanger arm 18. The strap attachment to the arm may be fixed in place with a flexible adhesive coating 32 that also covers at least the cam surface 24. Preferably a high-friction, ultraviolet resistant rubbery coating 32 covers most or all the elements of the invention. In prototypes, this coating was a brightly colored silicone rubber sealant. The coating fixes the arms 18 on the strap 26, integrates all elements physically and visually, provides a high friction contact surface 24, strengthens the strap 24, and protects all parts from ultraviolet light, salt, sand, and water.

The cam surface 24 is preferably rounded as shown. The contact point 40 of the cam surface against the pole 50 is vertically offset by a distance 42 from the center 44 of the connection point between the strap 26 and the hanger arm 18. The rubbery coating 32 provides a high static coefficient of friction against the pole 50 while also protecting the pole from damage that would occur using other types of clamping such as screws.

Figure 3:
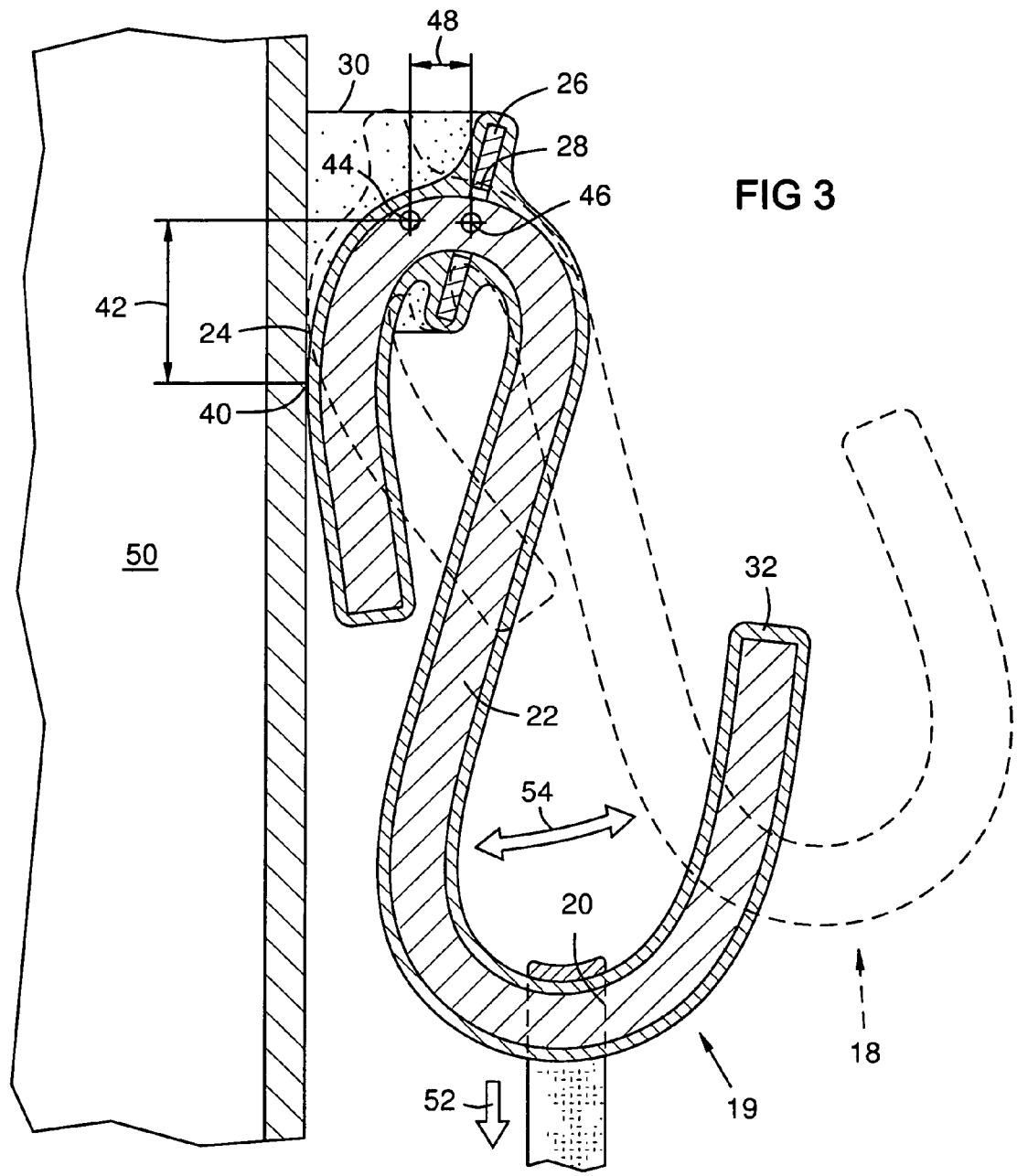
FIG. 3 is an enlarged sectional view of a hanger mounted on a pole in a loaded position showing automatic strap tightening.

The purpose of the cam surface 24 is to tighten the encircling band 30 automatically when a load 52 is hung on the load hook 20. FIG. 3 shows a difference in position of a hanger arm 18 in the unloaded condition and a hanger arm 19 in the loaded condition. A load 52 acts on the hanger arm 19 to pivot the arm generally in an arc 54. Due to the vertical separation 42 between the contact point 40 and the strap center 44, the strap center moves radially outward from the pole from position 44 to position 46, resulting in a local increase 48 in the radius of the encircling band 30, tightening the band.

There is no fixed pivot point for the cam 24, so the cam surface rolls downward against the pole surface for a short distance as the hanger arm is loaded. This rolling action maintains static frictional contact between the cam surface 24 and the pole 50, which avoids slipping. Heavier loads 52, result in tighter clamping action. A prototype of the invention held a 15 pound bag of sand on a single load hook with the prototype mounted on a conventional wooden pole of a patio umbrella. Often the load hooks will not be equally loaded, as in this test. If the most heavily loaded arm slips, the band 30 tightens further, due to its increasing angle, and its upward tension vector on the heavy arm increases. This operates somewhat like a finger locking sleeve toy. When multiple arms are heavily loaded the band 30 tightens from multiple cam actions producing multiple radial increases in the encircling band 30. The stiffness of the encircling band 30 can be designed in conjunction with the arm and cam leverages to provide an increase in hoop tension for loadings up to a given maximum on each arm.

Figure 4:
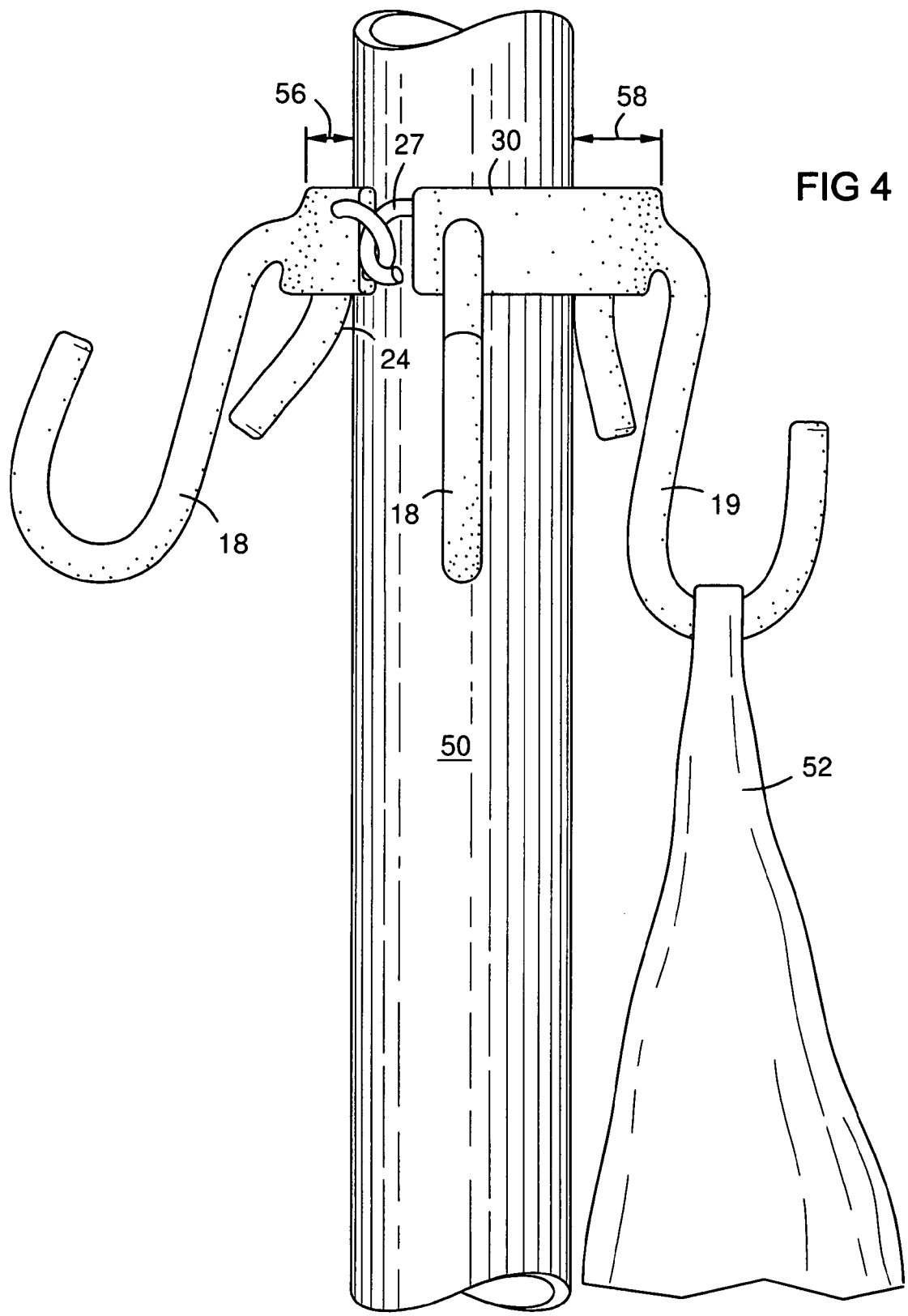
FIG. 4 is a front view of a ring of hangers mounted on a pole.
Figure 5:
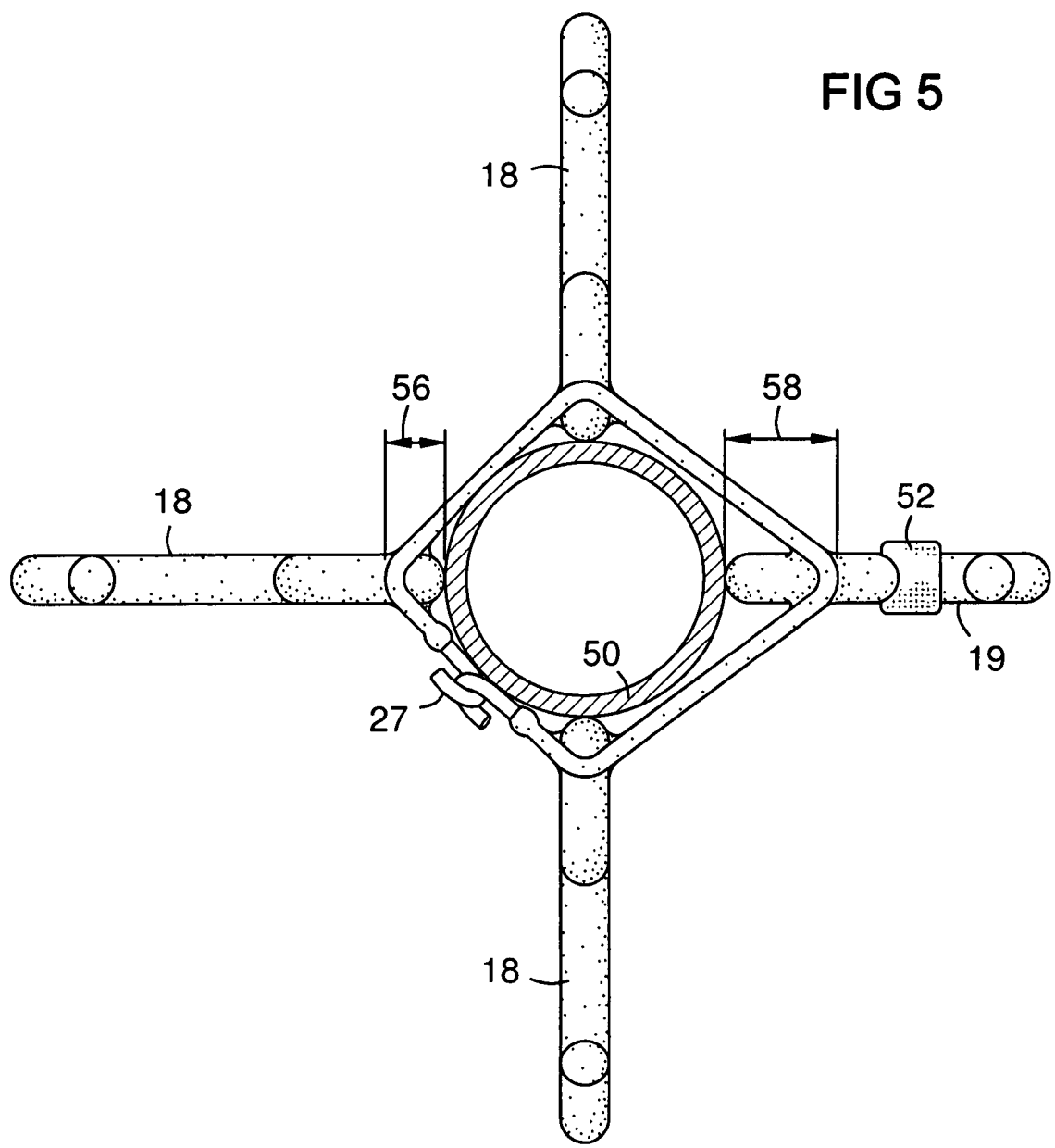
FIG. 5 is a top view of FIG. 4.

The strap 26 is preferably elastic to accommodate different sized poles and provide a hoop tension preload. The prototype used a rubber strap. The strap ends are connectable to each other with buckle hooks 27 as shown in FIG. 4 or other type of buckle, button, or hook and loop fastener. The strap 26 can alternately be made of fabric or other flexible strapping that has limited elasticity. A product based on this invention could be provided in different sizes for a wider range of pole diameters. The hanger arms 18 may be made of plastic, metal, or any similarly rigid or semi-rigid material.

In operation, a user simply passes the encircling band 30 around a pole, and hooks the ends together, and then hangs items on the load hooks 20 as desired.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. An accessory hanger for mounting on a vertical pole, comprising:
    a hanger arm comprising a top end and a bottom end, the bottom end comprising a load hook;
    a high friction cam surface on the hanger arm intermediate the top and bottom ends of the hanger arm and offset from a line between the top and bottom ends of the hanger arm;
    a band for encircling a pole, the band comprising first and second ends;
    first and second parts of a connecting device on the respective first and second ends of the band to releasably buckle the two ends of the band together; and
    the top end of the hanger arm attached to the band at an attachment point;
    wherein a downward movement of the load hook causes the cam surface to roll against the pole and cause a radially outward movement of the attachment point relative to the pole.

2. The accessory hanger of claim 1 wherein:
    the band comprises a strap of an elastic material;
    the hanger arm is formed generally in an S shape, with the bottom of the S comprising the load hook, and the top of the S comprising a curved cam portion;
    the top end of the hanger arm is inserted through a hole in the band; and
    the hanger arm and band are coated with a rubbery compound that provides the high friction cam surface on the cam portion of the hanger arm, and fixes the top end of the hanger arm to the band.

3. The accessory hanger of claim 1 further comprising a plurality of similar hanger arms similarly attached to the band in a sequence along the band.

4. An accessory hanger for mounting on a vertical pole, comprising:
    a band comprising first and second ends, each end having respective first and second parts of a buckling device that releasably connect the ends of the band together;
    a lever arm comprising a top end and a bottom end, the bottom end of the lever arm comprising a load hook;
    a high friction cam surface attached to the lever arm at an intermediate position between the top and bottom ends of the lever arm and offset from a line between the top and bottom ends of the lever arm;
    the top end of the lever arm attached to the band at a given attachment point;
    the relative positions of the cam surface, the band attachment point, and the load hook are configured such that when the band is buckled around a vertical pole the lever arm operates between an unloaded position and a loaded position, and movement of the lever arm from the unloaded position to the loaded position causes the given attachment point to move away from the pole, tightening the band on the pole;
    wherein the band comprises a strap of an elastic material;
    the lever arm is formed generally in an S shape, with the bottom of the S comprising the load hook, and the top of the S comprising a curved cam portion;
    the top of the S is inserted through a hole in the band; and
    the lever arm and band are coated with a rubbery compound that provides the high friction cam surface on the cam portion of the lever arm, and fixes the top end of the lever arm to the band.

5. The accessory hanger of claim 4 further comprising a plurality of similar lever arms similarly attached to the band in a sequence along the band.

6. An accessory hanger for mounting on a vertical pole, comprising:
    a band of an elastic material comprising first and second ends, each end having respective first and second parts of a buckling device that releasably connect the ends of the band together;
    a lever arm comprising a top end and a bottom end, the bottom end of the lever arm comprising a load hook;
    a high-friction cam surface attached to the lever arm at an intermediate position between the top and bottom ends of the lever arm and offset from a line between the top and bottom ends of the lever arm;
    the top end of the lever arm attached to the band at a given attachment point;
    the relative positions of the cam surface, the band attachment point, and the load hook are configured such that when the band is buckled around a vertical pole the lever arm operates between an unloaded position and a loaded position, and movement of the lever arm from the unloaded position to the loaded position causes the given attachment point to move away from the pole, tightening the band on the pole;
    wherein the lever arm is formed generally in an S shape, with the bottom of the S comprising the load hook, and the top of the S comprising a curved cam portion;
    the top of the S is inserted through a hole in the band; and
    the lever arm and the band are coated with a rubbery compound that provides the high friction cam surface on the cam portion of the lever arm, and fixes the top end of the lever arm to the band.

* * * * *